May 22, 1928.
H. N. KEEFER
1,670,967
SAFETY ATTACHMENT FOR MOTOR OPERATED VEHICLES
Filed Aug. 10, 1927 2 Sheets-Sheet 1
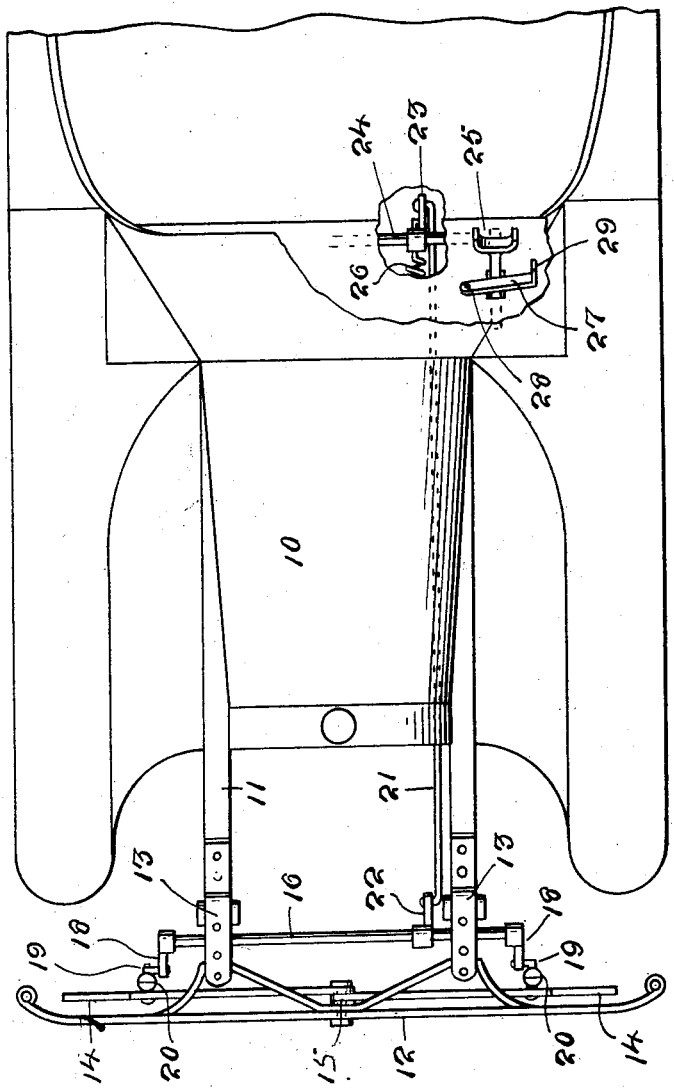
H. N. Keefer
INVENTOR
BY Victor J. Evans
ATTORNEY May 22, 1928.
H. N. KEEFER
SAFETY ATTACHMENT FOR MOTOR OPERATED VEHICLES
Filed Aug. 10, 1927
1,670,967
2 Sheets-Sheet 2
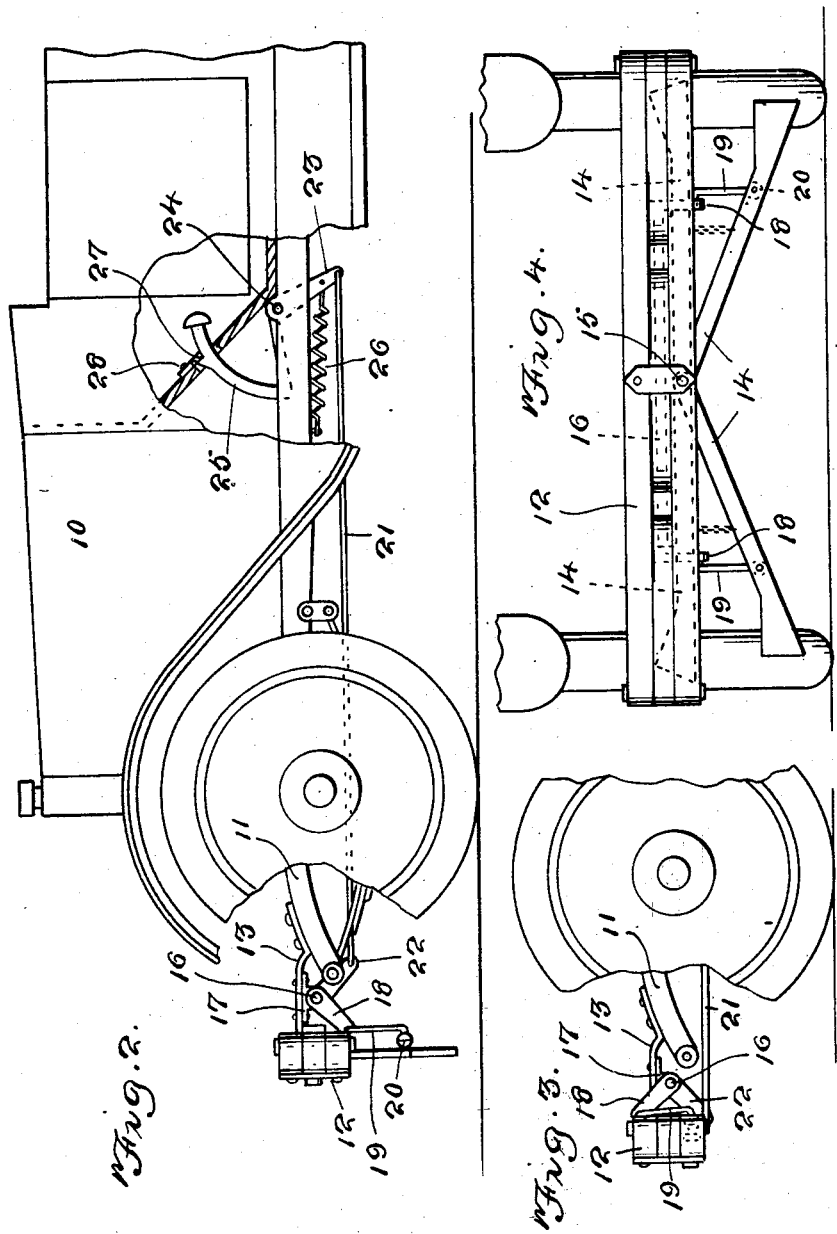
H. N. Keefer
INVENTOR
BY *Victor J. Evans*
ATTORNEY Patented May 22, 1928.

1,670,967

UNITED STATES PATENT OFFICE.

HOWARD NEWTON KEEFER, OF WEST MILTON, PENNSYLVANIA.

SAFETY ATTACHMENT FOR MOTOR-OPERATED VEHICLES.

Application filed August 10, 1927. Serial No. 212,093.

This invention contemplates the provision of a safety attachment for motor operated vehicles, and is in the nature of a guard adapted to push a person out of the path of movement of the vehicle, should said person be struck by the vehicle, thereby preventing the latter from passing over the body of the person.

More specifically stated, the invention embodies a pair of guard arms normally held in an elevated inactive position, and capable of being quickly lowered to an active position by means under the control of the operator of the vehicle, and held in said active position until released, whereupon the arms are automatically returned to their normal position.

The nature and advantages of the invention will be better understood when the following detail description is read in connection with the accompanying drawings, the invention residing in the construction, combination and arrangement of parts as claimed.

In the drawings forming part of this application like numerals of reference indicate similar parts in the several views and wherein:

Figure 1 is a fragmentary top plan view of a motor operated vehicle, showing the invention applied.

Figure 2 is a similar view showing the motor operated vehicle in side elevation and partly broken away.

Figure 3 is a fragmentary view of the vehicle showing the guard arms in their normally elevated positions.

Figure 4 is a front elevation showing the guard arms normally elevated by dotted lines, and their lower active positions by full lines.

Referring to the drawings in detail, 10 indicates generally a motor operated vehicle wherein the frame is represented at 11. A bumper of any ordinary well known construction is indicated at 12 and supported from and in advance of the frame 11 by suitable brackets 13.

The attachment forming the subject matter of the present invention includes a pair of pivotally mounted guard arms 14 adapted to be supported in any suitable manner at the front of the vehicle, and utilized to prevent a person who might be struck by the vehicle, from being run over thereby, the arms moving the body of the person out of the path of the vehicle. While these arms may be supported directly from the frame of the vehicle, or in any suitable manner without departing from the inventive idea, they are preferably pivoted as at 15 on the bumper 12, and capable of normally occupying an elevated position illustrated by dotted lines in Figure 4, or being quickly lowered to an active position as illustrated by full lines in the same figure.

The means for operating these arms is controlled by the operator of the vehicle, and includes a transverse shaft 16 journaled in suitable bearings 17 secured to the under side of the brackets 13. Carried by the ends of this shaft 16 are crank arms 18 from each of which depends a rod 19 connected with the adjacent arm by a socket connection 20. The shaft 16 is of course mounted for rocking movement and is controlled by an operating rod 21, the forward extremity of which is connected with a crank arm 22 carried by the shaft 16. The other end of the rod 21 is connected with a similar crank arm 23 projecting from the shaft 24 for the foot operated pedal 25, the latter of course projecting through an opening in the floor board of the vehicle. A spring 26 has one end fixed to the frame of the machine and its other end connected with the crank arm 23, and functions to normally hold the guard arms 14 arranged in their elevated inactive position. When so arranged, these arms occupy positions transversely of the vehicle directly behind the bumper. When it is desired to call the arms into use, it is only necessary to depress the pedal 25 which moves the rod 21 rearwardly against the tension of the spring 26, thereby rocking the shaft 16 in a direction to move the arms 14 to their active positions as will be readily understood. When the pedal is depressed for this purpose, a gravity latch 27 pivoted on the floor board of the vehicle as at 28, engages the pedal shank to hold the arms lowered when the foot is removed from the pedal. This latch is provided with an offset toe engaging portion 29, so that the latch can be easily moved away from the pedal shank, whereupon the spring 26 automatically returns the arms 14 and their associated parts to normal position.

While it is believed that from the foregoing description, the nature and advantages of the invention will be readily apparent, I desire to have it understood, that I do not limit myself to what is herein shown and described and that such changes may be resorted to when desired as fall within the scope of what is claimed.

What is claimed is:

1. A vehicle attachment of the character described comprising a pair of guard arms pivotally mounted at the front of the vehicle, means for normally holding said arms elevated in horizontal alignment, and manually controlled means for lowering said arms in divergent relation for the purpose specified.

2. A vehicle attachment of the character described comprising a pair of guard arms pivotally mounted at the front of the vehicle, means for normally holding said arms elevated in horizontal alignment, manually controlled means for lowering said arms in divergent relation, and means for holding said arms fixed relatively in their active lowered position.

3. A vehicle attachment of the character described comprising a pair of pivotally mounted arms arranged in advance of the vehicle, means for normally holding said arms elevated in horizontal alignment and including a resilient element, manually controlled means for lowering said arms in divergent relation against the tension of said resilient element, said resilient element automatically returning the arms to normal position subsequent to the release of the last mentioned means.

4. A vehicle attachment of the character described comprising a pair of pivotally mounted arms arranged in advance of the vehicle and normally disposed in horizontal alignment, means including a foot actuated pedal for lowering said arms in divergent relation, and resilient means for automatically returning said arms to normal positions subsequent to the release of said pedal.

5. In a vehicle attachment of the character described, a pair of pivotally mounted arms arranged in advance of the vehicle and normally in horizontal alignment, manually controlled means for moving said arms downwardly into divergent relation, a gravitating latch element for holding said arms lowered, and resilient means for automatically returning said arms to their normal positions subsequent to the release of said latch.

6. A vehicle attachment of the character described, comprising a pair of pivotally mounted arms arranged in advance of the vehicle and normally in horizontal alignment, a transverse shaft mounted for rocking movement, crank arms carried by said shaft, bars depending from said crank arms and connected with the first mentioned arms, manually controlled means for rocking said shaft in a direction to lower said arms into divergent relation, resilient means for automatically returning the arms to their normal positions when released, and means for holding said arms lowered against the action of said resilient means.

7. A vehicle attachment of the character described comprising a pair of guard arms pivotally mounted at the front of the vehicle, and capable of being arranged in horizontal alignment or in devergent relation, and means for normally holding said arms in horizontal alignment.

8. A vehicle attachment of the character described comprising a pair of movably mounted guard arms supported at the front of the vehicle, means for normally holding said arms in elevated horizontal alignment, and means whereby said arms may be lowered in divergent relation for the purpose specified.

In testimony whereof I affix my signature.

HOWARD N. KEEFER.